United States Patent [19]

Yonemitsu et al.

[11] 3,923,884
[45] Dec. 2, 1975

[54] PROCESS FOR PRODUCING DL-TARTARIC ACID

[75] Inventors: Eiichi Yonemitsu; Hiroshi Miyamori; Mutsuhiko Takeda, all of Chiba; Yukio Sasaki, Tokyo, all of Japan

[73] Assignee: Mitsubishi Gas Chemical Company, Inc., Tokyo, Japan

[22] Filed: Apr. 17, 1974

[21] Appl. No.: 461,656

[30] Foreign Application Priority Data
Apr. 17, 1973  Japan................................ 46-43429

[52] U.S. Cl. ................................................ 260/536
[51] Int. Cl.$^2$........................................... C07C 59/14
[58] Field of Search ..................................... 260/536

[56] References Cited
UNITED STATES PATENTS
2,754,325   7/1956   Smith.................................. 260/536
3,769,339   10/1973  Wagner et al. ..................... 260/536

*Primary Examiner*—James A. Patten
*Assistant Examiner*—Paul J. Killos
*Attorney, Agent, or Firm*—Stewart and Kolasch, Ltd.

[57] ABSTRACT dl-Tartaric acid is produced by hydrolysis of epoxysuccinic acid by the process, comprising contacting an aqueous epoxysuccinic acid solution with a catalyst containing activated charcoal, aluminum oxide or ferric oxide which is substantially insoluble in said solution. Conversion of epoxysuccinic acid as well as selectivity to dl-tartaric acid are very high.

10 Claims, No Drawings

PROCESS FOR PRODUCING DL-TARTARIC ACID

This invention relates to a process for producing dl-tartaric acid. More particularly, this invention relates to an improvement of the process for producing dl-tartaric acid by hydrolysis of epoxysuccinic acid.

dl-Tartaric acid has been used as food additives such as sour seasonings. It can also widely be used as industrial chemicals such as starting materials for detergents.

It has heretofore been know to produce dl-tartaric acid by allowing hydrogen peroxide to react with maleic acid in the presence of a tungsten compound catalyst (see, for example, J. M. Charch and R. Blumbery: Industrial and Engineering Chemistry vol. 43, p.1780 (1951)). According to this method, it is known that epoxysuccinic acid is formed as intermediate which is then hydrolyzed to produce dl-tartaric acid. However, epoxysuccinic acid, as different from other epoxy compounds, contains an oxirane ring in the molecule which is very stable. Therefore, preparation of dl-tartaric acid by hydrolysis of this compound is not easy. In the absence of a catalyst, even after boiling of an aqueous solution of epoxysuccinic acid which is continued as long as, for example, 5 hours, only 73.8% of said compound is hydrolyzed.

As catalysts for hydrolysis of oxirane rings, acids or bases have heretofore been generally known. However, to the best of our knowledge, when sulfuric acid, for example, is used as a catalyst for preparation of dl-tartaric acid by hydrolysis of epoxysuccinic acid, there are drawbacks such that a great amount of sulfuric acid has to be used, that it takes a long time to carry out the reaction and that the yield of dl-tartaric acid is low. On the other hand, when bases such as caustic alkalis are used as catalysts, the products are in the form of alkali salts of dl-tartaric acid and disadvantageous in the production of free dl-tartaric acid. Furthermore, when the rate of reaction is increased by using sulfuric acid in the production of dl-tartaric acid, the selectivity is lowered. On the other hand, the rate of reaction must be decreased in order that the selectivity should not be lowered.

The object of the present invention is to provide an industrially advantageous process for producing dl-tartaric acid from epoxysuccinic acid in a very short time with good conversion as well as selectivity.

It has now been found that activated charcoal, aluminum oxide or ferric oxide effectively catalyzes the hydrolysis of epoxysuccinic acid. Namely, the present invention provides a process for producing dl-tartaric acid from epoxysuccinic acid, comprising contacting an aqueous epoxysuccinic acid solution with a catalyst containing activated charcoal, aluminum oxide or ferric oxide which is substantially insoluble with said solution.

The catalyst containing activated charcoal, aluminum oxide or ferric oxide to be used in the present invention is a substance which is normally in the solid state and is insoluble in an aqueous epoxysuccinic acid solution. As the catalyst containing activated charcoal, aluminum oxide or ferric oxide, the substance per se, alone or in mixtures, of these activated charcoal, aluminum oxide or ferric oxide may be used. Alternatively, other compounds containing these substances may also be used. For example, silica-alumina which contains aluminum oxide or oxide complexes which contain ferric oxide and other metal oxides such as titanium oxide, e.g. titanium oxide ferric oxide (represented by $2Fe_2O_3 \cdot 3TiO_2$ or $Fe_2O_3 \cdot 3TiO_2$) may be mentioned. These substances catalyze the hydrolysis of epoxysuccinic acid in heterogeneous catalytic systems.

Among these catalysts, the catalyst containing aluminum oxide or ferric oxide is preferred from the standpoint of activity per unit weight. Above all, the catalyst containing ferric oxide is most preferred. Although the catalyst containing activated charcoal is the lowest in catalytic activity among the three, it has an advantage that colorless dl-tartaric acid can be produced by the effect of decoloration of activated charcoal even if the starting epoxysuccinic acid may contain colored impurities.

The amount of the catalyst used may vary depending on the catalyst employed, the temperature at the time of hydrolysis, and the concentration of the aqueous epoxysuccinic acid solution. Usually, when a catalyst containing activated charcoal is used, the amount of activated charcoal is preferably from 10 to 40% by weight, most preferably from 15 to 30% by weight, based on epoxysuccinic acid. On the other hand, when a catalyst containing aluminum oxide or ferric oxide is used, the amount of aluminum oxide or ferric oxide is preferably from 0.5 to 10% by weight, most preferably from 1 to 5% by weight based on epoxysuccinic acid.

These catalysts are insoluble solids and therefore they can easily be separated from the reaction mixture by filtration, after the hydrolysis reaction is over. Repeated use of these catalysts is also possible. The process according to the present invention is also suitable for practicing a continuous reaction by the use of a fixed-bed reactor.

The starting epoxysuccinic acid may either be cis-epoxysuccinic acid or trans-epoxysuccinic acid, but cis-epoxysuccinic acid is preferred because no mesotartaric acid is by-produced.

The epoxysuccinic acid used as the starting material may be produced in any way. For example, it may be produced by allowing hydrogen peroxide to react with maleic acid in an aqueous solution in the presence of a tungsten compound catalyst. Alternatively, it may be produced according to the method, comprising allowing hydrogen peroxide to react with acid calcium maleate in an aqueous solution in the presence of a tungsten compound catalyst to prepare acid calcium epoxysuccinate and then subjecting this acid calcium epoxysuccinate to acid decomposition. Furthermore, epoxysuccinic acid from the decomposed liquid obtained by acid decomposition of an epoxysuccinic acid salt or ester may also be used. The decomposed liquid itself may also be available.

The concentration of an aqueous epoxysuccinic acid solution is not particularly limited, so long as it is a homogenous aqueous solution at the reaction temperature. Industrially, however, it is preferred to use a solution containing 10 to 50% by weight of epoxysuccinic acid.

The reaction temperature may be the reflux temperature at the normal pressure of an aqueous epoxysuccinic acid solution or lower. Preferably, however, the reaction temperature is 110°C or less, most preferably from 95° to 100°C.

The thus obtained reaction mixture is subjected to filtration, while it is still hot, to remove the catalyst. The filtrate is directly or after concentration, if necessary, cooled to crystallize dl-tartaric acid which is then separated, or the filtrate is evaporated to dryness, to obtain crystals of dl-tartaric acid. According to the process of the present invention, dl-tartaric acid can be obtained in a very short time, namely in 2 hours or less, preferably from 1 to 2 hours, whereby conversion of epoxysuccinic acid reaches 95% or more and the selectivity of dl-tartaric acid from epoxysuccinic acid is very high to result in increase in the yield of dl-tartaric acid.

The process of the present invention is further advantageous in that separation and recovery of catalyst are very easy. The filtrate, which is obtained after dl-tartaric acid is crystallized and the crystals are separated from the reaction mixture after removal of the catalyst, contains dl-tartaric acid remaining in a solution and traces of unaltered epoxysuccinic acid. This filtrate and the catalyst removed therefrom is readily available for recycle for re-use. The present invention is also industrially advantageous in this respect.

The process of the present invention is further illustrated in detail with reference to the following examples.

In the examples as set forth below, for the purpose of showing the result briefly, the product crystals are obtained by the method wherein the reaction mixture after removal of the catalyst is evaporated to dryness. Accordingly, the product crystals in the examples contain traces of unaltered epoxysuccinic acid, which can be removed substantially completely by recrystallization of the above crude product crystals from an aqueous solution thereof. Accordingly, crystals of dl-tartaric acid with a purity of 99.5% or more are obtained by the crystallization method.

EXAMPLE 1

To an aqueous solution having 6.6 g of epoxysuccinic acid dissolved in 50 g of water is added 1 g of commerically available activated charcoal powders and the mixture is heated at 100°C for 2 hours under gentle stirring. As the result, the conversion of epoxysuccinic acid is 96.3%. The reaction mixture is filtered, while it is still hot, to separate it into activated charcoal and the filtrate. The catalyst is washed with hot water and the washed water is added to the filtrate. The filtrate containing this washed water is evaporated to dryness and the obtained crystals are dried to constant weight to obtain 7.46 g of dl-tartaric acid crystals with a purity of 96.9%. This corresponds to a 96.3% yield of dl-tartaric acid based on the starting epoxysuccinic acid. In this crystal is contained 0.23 g of unaltered epoxysuccinic acid.

EXAMPLE 2

Example 1 is repeated except that 0.153 g of aluminum oxide ($\alpha$-$Al_2O_3$) is used in place of activated charcoal and the reaction is conducted for 1 hour.

Conversion of epoxysuccinic acid is 95.2% and 7.42 g of dl-tartaric acid crystals with a purity of 96.1% is obtained. This corresponds to a 95.0% yield of dl-tartaric acid based on the starting epoxysuccinic acid. In this crystal is contained 0.29 g of unaltered epoxysuccinic acid.

EXAMPLE 3

Example 1 is repeated except that 0.240 g of ferric oxide ($\alpha$-$Fe_2O_3$) is used in place of activated charcoal and the reaction is conducted for 1 hour.

Conversion of epoxysuccinic acid is 95.8% and 7.41 g of dl-tartaric acid crystals with a purity of 96.8% is obtained. This corresponds to a 95.6% yield of dl-tartaric acid based on the starting epoxysuccinic acid. In the crystals is contained 0.23 g of unaltered epoxysuccinic acid.

COMPARATIVE EXAMPLE 1

An aqueous solution having 6.6 g of epoxysuccinic acid dissolved in 50 g of water is refluxed for 1 hour under heating, whereby the conversion of epoxysuccinic acid is 22.0% and the yield of dl-tartaric acid based on the starting epoxysuccinic acid is 21.6%. When the solution is further refluxed under heating for an additional 4 hours, the conversion of epoxysuccinic acid is only 73.8%. In this reaction mixture is contained dl-tartaric acid in a yield of 72.5% based on the starting epoxysuccinic acid.

COMPARATIVE EXAMPLE 2

An aqueous solution having 6.6 g of epoxysuccinic acid and 2.6 g of 95.4% sulfuric acid dissolved in 50 g of water is refluxed for 1 hour under heating.

Conversion of epoxysuccinic acid is 34.1%. In the reaction mixture is contained dl-tartaric acid corresponding to a 31.6% yield based on the starting epoxysuccinic acid. When the solution is further refluxed under heating for an additional 4 hours, the conversion of epoxysuccinic acid is only 87.5% and in the reaction mixture is contained dl-tartaric acid corresponding to a 81.0% yield based on the starting epoxysuccinic acid.

EXAMPLE 4

Example 1 is repeated except that 0.508 g of silica-alumina (13% by weight of $Al_2O_3$ content) is used in place of activated charcoal and the reaction is conducted for 1 hour.

Conversion of epoxysuccinic acid is 97.0% and 7.50 g of dl-tartaric acid crystals with a purity of 95.5% is obtained. This corresponds to a 95.5% yield of dl-tartaric acid based on the starting epoxysuccinic acid. In the reaction mixture is contained 0.22 g of unaltered epoxysuccinic acid.

EXAMPLE 5

Example 1 is repeated except that 0.495 g of titanium oxide ferric oxide ($Fe_2O_3.3TiO_2$) is used in place of activated charcoal and the reaction is conducted for 1 hour.

Conversion of epoxysuccinic acid is 95.5% and 7.43 g of dl-tartaric acid crystals with a purity of 96.0% is obtained. This corresponds to a 95.1% yield of dl-tartaric acid based on the starting epoxysuccinic acid. In the reaction mixture is contained 0.20 g of unaltered epoxysuccinic acid.

What we claim is:

1. A process for producing dl-tartaric acid by hydrolysis of epoxysuccinic acid, comprising contacting an aqueous epoxysuccinic acid solution with a catalyst consisting essentially of activated charcoal, aluminum oxide or ferric oxide, and mixtures thereof said catalyst being substantially insoluble in said aqueous epoxysuccinic acid solution.

2. A process according to claim 1 wherein the catalyst consists essentially of activated charcoal in an amount from 10 to 40% by weight based on epoxysuccinic acid.

3. A process according to claim 1 wherein the catalyst consists essentially aluminum oxide or ferric oxide in an amount from 0.5 to 10% by weight based on epoxysuccinic acid.

4. A process according to claim 1 wherein the catalyst is activated charcoal per se.

5. A process according to claim 1 wherein the catalyst is aluminum oxide per se.

6. A process according to claim 1 wherein the catalyst is ferric oxide per se.

7. A process according to claim 1 wherein the catalyst is silica-alumina.

8. A process according to claim 1 wherein the catalyst is titanium oxide-ferric oxide.

9. A process according to claim 1 wherein the epoxysuccinic acid is hydrolyzed at a temperature of 110°C or less.

10. A process according to claim 1 wherein the epoxysuccinic acid is hydrolyzed at a temperature in the range from 95° to 100°C.

* * * * *

UNITED STATES PATENT AND TRADEMARK OFFICE
CERTIFICATE OF CORRECTION

PATENT NO. : 3,923,884
DATED : December 2, 1975
INVENTOR(S) : Eiichi YONEMITSU et al It is certified that error appears in the above—identified patent and that said Letters Patent are hereby corrected as shown below:

In the Heading of the Patent, in the category "Foreign Application Priority Data," change "46-43429" to --48-43429--.

Signed and Sealed this

Nineteenth Day of June 1984

[SEAL]

Attest:

Attesting Officer

GERALD J. MOSSINGHOFF
Commissioner of Patents and Trademarks